United States Patent
O'Dea et al.

(10) Patent No.: US 8,326,494 B2
(45) Date of Patent: Dec. 4, 2012

(54) METHOD AND APPARATUS FOR DETERMINING A DESIRED YAW RATE FOR A VEHICLE

(75) Inventors: Kevin A. O'Dea, Ann Arbor, MI (US); Christopher A. Kinser, Grand Blanc, MI (US); Mohammad A. Fayyad, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1076 days.

(21) Appl. No.: 12/258,205

(22) Filed: Oct. 24, 2008

(65) Prior Publication Data

US 2010/0106378 A1 Apr. 29, 2010

(51) Int. Cl.
*B60R 22/00* (2006.01)
*G01P 3/04* (2006.01)
(52) U.S. Cl. ............................................. 701/48; 73/511
(58) Field of Classification Search .................... None
See application file for complete search history.

(56) References Cited

U.S. PATENT DOCUMENTS

| | | | |
|---|---|---|---|
| 5,515,275 A * | 5/1996 | Ackermann | 701/41 |
| 5,720,533 A | 2/1998 | Pastor et al. | |
| 5,941,919 A | 8/1999 | Pastor et al. | |
| 6,408,687 B1 * | 6/2002 | Ashrafi et al. | 73/117.02 |
| 6,643,573 B2 | 11/2003 | Dickinson et al. | |
| 6,862,506 B2 | 3/2005 | Boswell et al. | |
| 7,325,454 B2 * | 2/2008 | Saito et al. | 73/511 |
| 7,908,112 B2 * | 3/2011 | Nardi et al. | 702/142 |
| 8,050,838 B2 * | 11/2011 | Ryu et al. | 701/79 |
| 2002/0059821 A1 * | 5/2002 | Ashrafi et al. | 73/116 |
| 2003/0182025 A1 * | 9/2003 | Tseng et al. | 701/1 |
| 2005/0102085 A1 * | 5/2005 | Sakata | 701/72 |
| 2006/0065050 A1 * | 3/2006 | Saito et al. | 73/511 |
| 2007/0260383 A1 * | 11/2007 | Sundaram et al. | 701/70 |
| 2010/0106378 A1 * | 4/2010 | O'Dea et al. | 701/48 |
| 2010/0131144 A1 * | 5/2010 | Ryu et al. | 701/29 |
| 2010/0131145 A1 * | 5/2010 | Ryu et al. | 701/29 |
| 2010/0131146 A1 * | 5/2010 | Nardi et al. | 701/29 |
| 2010/0131229 A1 * | 5/2010 | Nardi et al. | 702/142 |
| 2011/0125455 A1 * | 5/2011 | Nardi et al. | 702/142 |

* cited by examiner

*Primary Examiner* — Thomas Tarcza
*Assistant Examiner* — Nagi Murshed
(74) *Attorney, Agent, or Firm* — Ingrassia Fisher & Lorenz, P.C.

(57) ABSTRACT

Methods and systems are provided for determining a desired yaw rate for a vehicle. The vehicle has a plurality of handling states and comprises a yaw rate sensor for determining an actual yaw rate. The method comprises selecting one of the plurality of handling states, determining the desired yaw rate for the vehicle based on the road wheel angle, the velocity, and the selected one of the plurality of handling states, and activating one or more vehicle stability control measures if the difference between the desired yaw rate and the actual yaw rate for the vehicle exceeds a predetermined threshold.

12 Claims, 2 Drawing Sheets

METHOD AND APPARATUS FOR DETERMINING A DESIRED YAW RATE FOR A VEHICLE

TECHNICAL FIELD

The present invention generally relates to vehicle stability control systems, and more particularly relates to an apparatus and method for determining a desired yaw rate for a vehicle.

BACKGROUND OF THE INVENTION

Many vehicles today include stability control systems configured to improve the handling of the vehicle. These stability control systems typically use a reference model for determining a desired yaw plane behavior (e.g., yaw rate) for the vehicle based on certain characteristics of its motion, such as the steering wheel angle and the velocity. The desired yaw plane behavior is then compared to the actual yaw plane behavior for the vehicle to determine whether any stability control measures are necessary.

This method for determining the desired yaw plane behavior for a vehicle may result in imprecise values for vehicles that have multiple settings, modes, and/or configurations (e.g., handling states) that affect the desired yaw plane behavior. For example, a vehicle suspension system may have multiple operational modes (e.g., a "normal" mode and a "performance" mode) that each result in different handling state and desired yaw plane behaviors for the vehicle for a given steering angle and velocity. Vehicle stability control systems that do not account for these different vehicle handling states may produce inaccurate determinations of the desired yaw plane behavior that can result in the activation of vehicle stability control measures at inappropriate times.

Accordingly, it is desirable to provide a method for determining a desired yaw plane behavior for the vehicle that is based on the current handling state of the vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment a method is provided for determining a desired yaw rate for a vehicle. The vehicle has a plurality of handling states and comprises a yaw rate sensor for determining an actual yaw rate. The method comprises selecting one of the plurality of handling states, determining the desired yaw rate for the vehicle based on the road wheel angle, the velocity, and the selected one of the plurality of handling states, and activating one or more vehicle stability control measures if the difference between the desired yaw rate and the actual yaw rate for the vehicle exceeds a predetermined threshold.

In other embodiments, a system is provided for determining a desired yaw rate for a vehicle having a plurality of handling states. The system comprises a steering angle sensor for providing output signals indicative of a steering angle of the vehicle, at least one wheel speed sensor for providing output signals indicative of a velocity of the vehicle, and a processor coupled to the steering angle sensor and to the at least one wheel speed sensor. The processor is configured to select one of the plurality of handling states for the vehicle, determine a road wheel angle based on the steering angle, determine a desired steady state yaw rate for the vehicle based on the road wheel angle and the velocity, and applying a filter to the desired steady state yaw rate, wherein the value of the filter is dependent on the selected one of the plurality of handling states.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the present invention may be described herein in terms of functional and/or logical block components and various processing steps. It should be appreciated that such block components may be realized by any number of hardware, software, and/or firmware components configured to perform the specific functions. For example, an embodiment of the invention may employ various integrated circuit components (e.g., memory elements, digital signal processing elements, logic elements, look-up tables, or the like) which may carry out a variety of functions under the control of one or more microprocessors or other control devices. In addition, those skilled in the art will appreciate that embodiments of the present invention may be practiced in conjunction with any number of vehicle stability control systems, and that the vehicle stability control system described herein is merely one exemplary embodiment.

In addition, the connecting lines shown in various figures contained herein are intended to represent exemplary functional relationships and/or physical couplings between the various elements. It should be noted that many alternative or additional functional relationships or physical connections may be present in an embodiment of the present invention.

Figure 1:
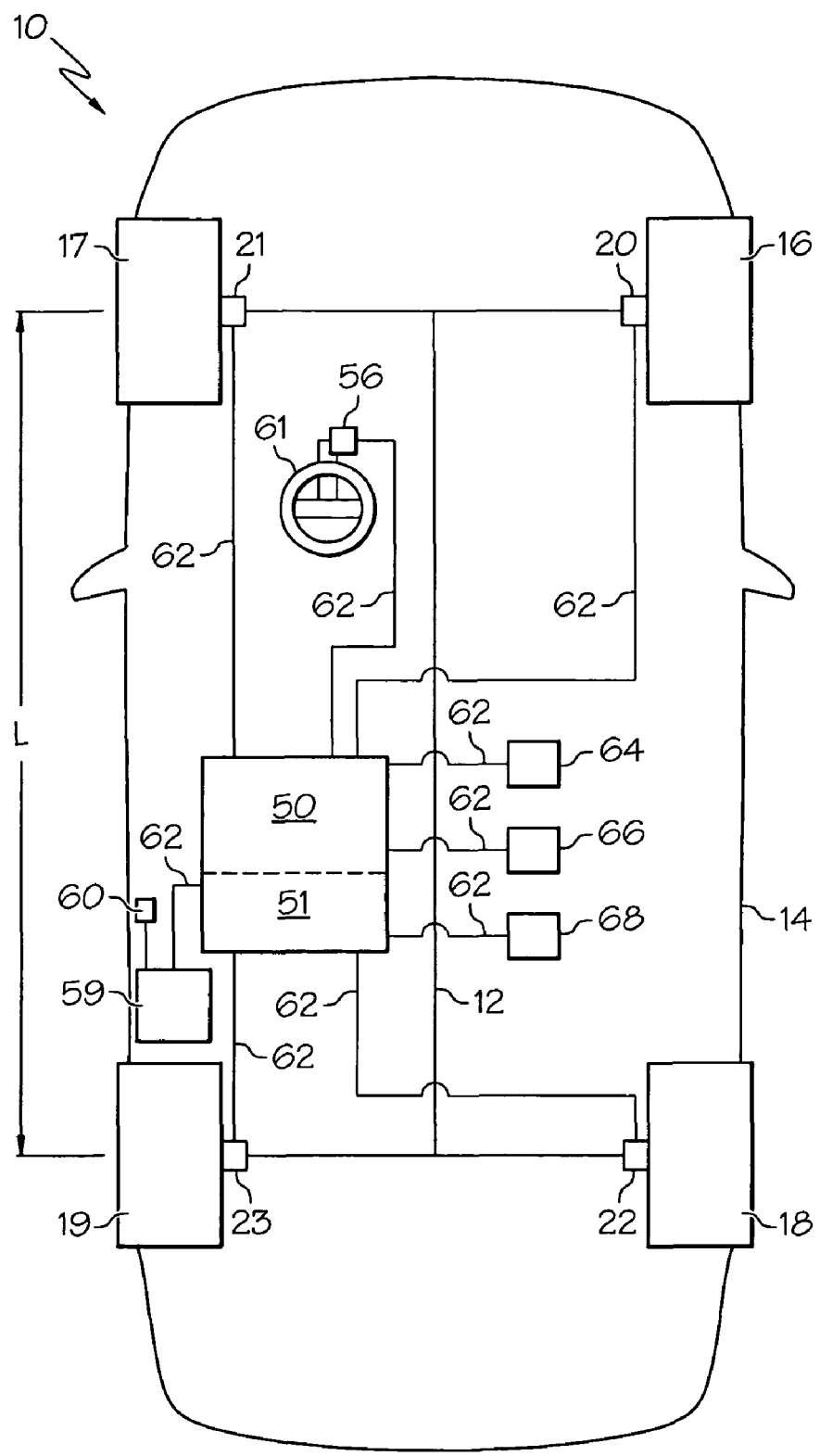
FIG. 1 depicts an exemplary vehicle configured for use with one embodiment of the present invention.

FIG. 1 depicts an exemplary vehicle 10 configured for use with one embodiment the present invention. The vehicle 10 includes a chassis 12, a body 14, and four wheels 16, 17, 18, and 19. The body 14 is arranged on the chassis 12 and substantially encloses the other components of the vehicle 10. The body 14 and the chassis 12 may jointly form a frame. The wheels 16-19 are each rotatably coupled to the chassis 12 near a respective corner of the body 14. Each wheel 16-19 includes a wheel speed sensor 20, 21, 22, 23 for detecting, and providing output signals regarding, the angular velocity of the wheel. As depicted, the vehicle 10 has a wheel base (L) that is the distance between the center of the front wheels 16, 17 and the centers of the rear wheels 18, 19.

Vehicle 10 may be any one of a number of different types of vehicles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

Vehicle 10 also includes a processor 50, memory 51, a steering angle sensor 56 for providing output signals regarding the steering angle of the vehicle 10, a control unit 59, and a yaw rate sensor 60. In one embodiment, steering angle sensor 56 is coupled to, and configured to detect movement of, the steering wheel 61. However, it will be noted by one who is skilled in the art that other configurations for the steering wheel sensor 56 may also be utilized.

Control unit 59 receives information from processor 50 via a vehicle communications bus 62. Control unit 59 uses parameters calculated by processor 50 to control various actions of the vehicle 10. In one embodiment, control unit 59 activates electronic stability control measures based on a desired yaw rate as determined by processor 50 and the actual yaw rate as determined by the actual yaw rate sensor 60.

Processor 50 may comprise any type of processor or multiple processors, single integrated circuits such as a microprocessor, or any suitable number of integrated circuit devices and/or circuit boards working in cooperation to accomplish the functions of a processing unit. During operation, processor 50 executes one or more programs preferably stored within memory 51. The memory 51 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 51 may be a single type of memory component, or it may be composed of many different types of memory components. In addition, memory 51 and processor 50 may be distributed across several different computers.

Processor 50 is coupled to wheel speed sensors 20-23, steering angle sensor 56, and control unit 59 via the vehicle communication bus 62. In addition, processor 50 is coupled to various electronic systems (ECUs) for the vehicle 10 via the vehicle communication bus 62. In the depicted embodiment, these ECUs include a vehicle suspension system 64, a vehicle steering system 66, and a tire pressure monitoring system 68.

Processor 50 selects a current handling state for the vehicle 10 from a plurality of possible handling states. As described above, vehicle 10 may have a plurality of handling states that affect the yaw plane behavior of the vehicle 10. Each handling state corresponds to a different group of settings, modes, and/or configurations for the vehicle 10. For example, the suspension system 64 of the vehicle may have a plurality of operational modes (e.g., "normal" mode, "performance" mode, "active roll" mode) that each correspond to different handlings states for the vehicle 10. In addition, other parameters may also affect the current handling state for the vehicle, including the tire pressure of wheels 16-19, a driver-selectable steering mode of the vehicle 10, or one or more fault conditions for the vehicle 10. Processor 50 communicates with the appropriate vehicle systems and ECUs (e.g., the suspension system 64, steering system 66, and tire pressure monitoring system 68) to select the current handling state for the vehicle from the plurality of possible handling states.

Processor 50 then determines the desired yaw rate for vehicle 10 based on the current road wheel angle, velocity, and the selected one of the plurality of handling states. The values for the desired yaw rate are determined during testing and configuration of the vehicle. Vehicles having each potential handling state are tested to determine a desired yaw rate that corresponds to each possible combination of road wheel angle and velocity. The resulting yaw rates are stored and used as a basis for the models and lookup tables described below.

In one embodiment, processor 50 uses a dynamic reference model to determine the desired yaw rate. This dynamic reference model has both a steady state component and a transient component. The steady state component determines a desired steady state yaw rate based on the road wheel angle and the velocity of vehicle 10. The transient component of the reference model determines the desired yaw rate of the vehicle 10 by applying a filter to the desired steady state yaw rate. The filter utilizes at least one filter coefficient having a value that is dependent, at least in part, on the selected one of the plurality of handling states of the vehicle 10.

Figure 2:
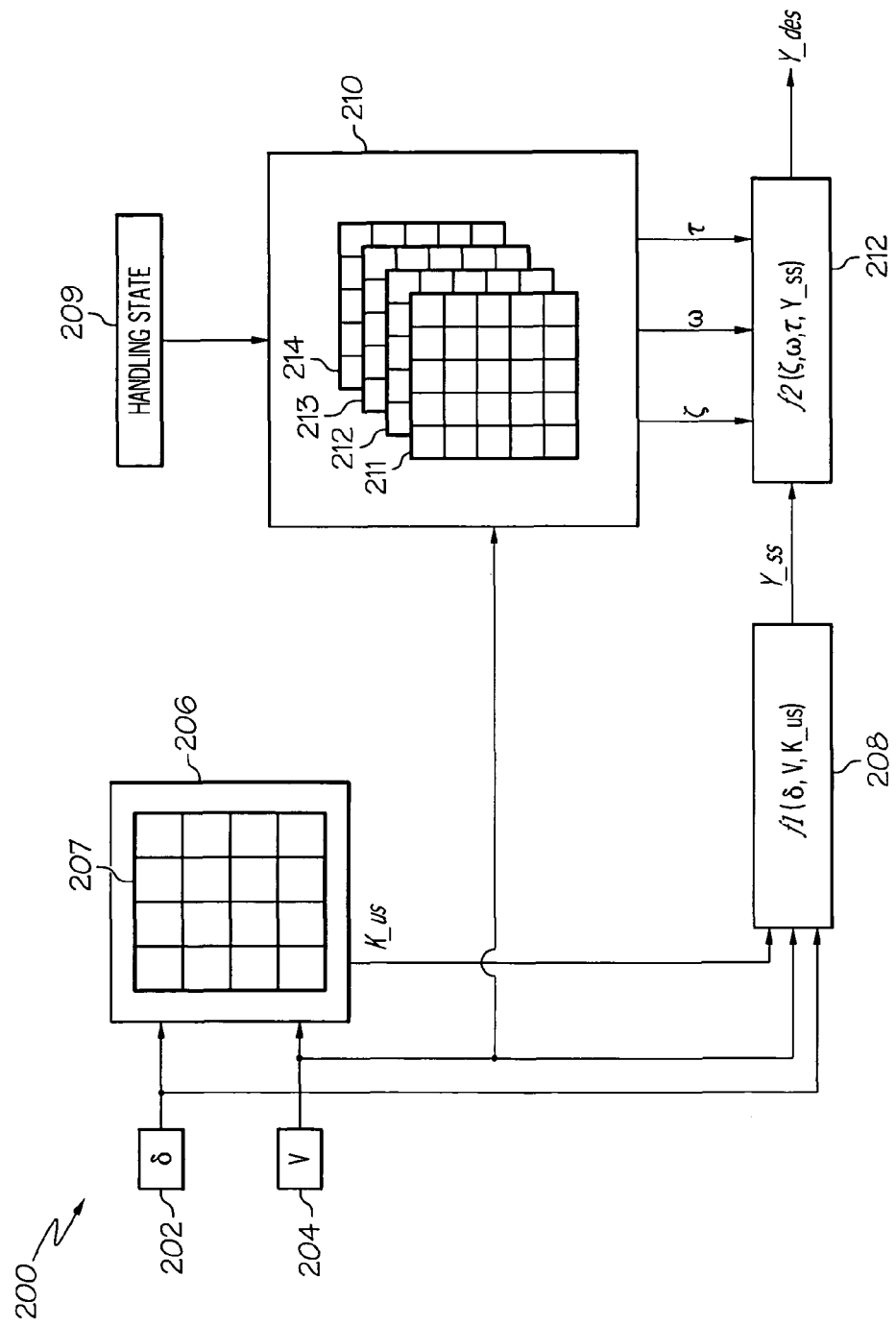
FIG. 2 is a flow diagram of an exemplary method for determining a desired yaw rate for a vehicle based on the operating state of the vehicle.

FIG. 2 is a flow diagram depicting an exemplary method 200 for determining a desired yaw rate for a vehicle (e.g., the vehicle 10 of FIG. 1) based on a selected one of a plurality of handling states. As further described below, method 200 determines the desired yaw rate based on the dynamic reference model described above. Thus, method 200 first determines a steady state yaw rate for the vehicle based on the road wheel angle and the velocity. Method 200 then determines the desired yaw rate by applying a filter to the desired steady state yaw rate. The filter value is based on at least one filter coefficient having a value that is dependent, at least in part, on a selected one or a plurality of handling states. It is to be understood that the certain of the steps described in conjunction with FIG. 2 may be performed in different orders than the illustrated and described order, and/or some steps may be performed in parallel with each other.

With reference to FIGS. 1 and 2, processor 50 determines the effective road wheel angle ($\delta$) for one or more of the wheels 16-19 during step 202. In one embodiment, processor 50 derives $\delta$ based on the current steering wheel angle for the vehicle. Processor 50 detects the current steering wheel angle based on signals received from the steering wheel angle sensor 56.

During step 204, processor 50 determines a velocity (V) for the vehicle. Processor 50 may detect V based on signals received from the wheel speed sensors 20-23. It will be appreciated that in certain embodiments the vehicle speed may also be ascertained using other techniques as well.

Next, processor 50 determines the value of an understeer gradient (K_us) for vehicle 10 (step 206). K_us is a measure of the tendency of vehicle 10 to "understeer" during a turn, which occurs when a circular path of the motion of vehicle 10 during the turn has a larger diameter than a circular path indicated by a direction in which the vehicle's road wheels are pointed. The value of K_us is dependent on both $\delta$ and V. In one embodiment, processor 50 utilizes a lookup table 207 to identify the value of K_us. Lookup table 207 associates multiple values for $\delta$ and V with their corresponding K_us values. It should be noted that in other embodiments K_us as a function of the lateral velocity of the vehicle using methods that are well known in the art.

During step 208, processor 50 determines the desired steady state yaw rate (e.g., Y_ss) based on $\delta$, V, and K_us. Processor 50 may use a plurality of techniques to determine Y_ss. For example, in a first embodiment, processor 50 determines Y_ss utilizing function $f1(\delta, V, K\_us)$ according to the equation:

$$Y\_ss = \left(\frac{\delta V}{L + K\_us V^2}\right) \tag{1}$$

where L is the wheel base for the vehicle 10.

In a second embodiment processor 50 determines Y_ss based on one or more lookup tables that associate multiple values of for δ and V with their corresponding Y_ss values. In this case, processor 50 determines Y_ss by locating the value in the lookup table that corresponds to δ and V.

Processor 50 also selects the appropriate handling state for the vehicle from a plurality of handling states (step 209). As mentioned above, in one embodiment processor 50 communicates with the appropriate vehicle systems and ECUs to select the handling state during step 209.

Next, processor 50 determines the value of at least one filter coefficient based, at least in part, on the selected one of a plurality of handling states (step 210). In the depicted embodiment, the filter uses three filter coefficients (ζ, ω, and τ). However, it will be understood by one who is skilled in the art that other filters having different filter coefficients may also be used in connection with embodiments of the present invention.

In one embodiment, processor 50 detects the filter coefficient values based on a set of lookup tables 211, 212, 213, 214. Each lookup table 211-214 corresponds to a separate handling state of the vehicle 10 and associates values of V with corresponding filter coefficient values (e.g., ζ, ω, and τ). Processor 50 determines the values of the filter coefficients by identifying the lookup table 211-214 that corresponds to the current handling state of the vehicle 10 and identifying the values of the filter coefficients that correspond to V in the identified lookup table. Other methods for determining the values of the filter coefficients may also be utilized, provided that the values of the filter coefficients are dependent, at least in part, on the handling state of the vehicle 10.

Next, processor 50 determines the desired yaw rate (Y_des) for the vehicle by applying a filter to Y_ss (step 212). The filter utilizes the filter coefficients identified during step 210. In one embodiment, processor 50 uses a second order filter f2(ζ, ω, τ, Y_ss) according to the equation:

$$Y\_des = \left(\frac{1 - 2\zeta\omega + \omega^2}{s^2 - s2\zeta\omega + \omega^2}\right)\left(\frac{\tau}{s(\tau - 1) + 1}\right)(Y\_ss) \quad (2)$$

where s is the Laplace transform variable for representing the transformation of equation 2 from the time domain into the frequency domain.

Processor 50 may then transmit Y_des to the control unit 59. As described above, control unit 59 controls the operation of one of more vehicle functions (such as the brakes for the vehicle) to maintain a desired yaw plane behavior. For example, in one embodiment control unit 59 compares the desired yaw rate (e.g., Y_des) to the actual yaw rate of the vehicle, as determined by yaw rate sensor 60. If the difference between Y_des and the actual yaw rate exceeds a predetermined threshold, control unit 59 implements electronic stability control maneuvers While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining a desired yaw rate for a vehicle, the vehicle having a plurality of handling states and comprising a yaw rate sensor for determining an actual yaw rate, the method comprising:
  selecting one of the plurality of handling states via a processor;
  determining the desired yaw rate for the vehicle based on the road wheel angle, the velocity, and the selected one of the plurality of handling states via the processor, wherein the step of determining the desired yaw rate of the vehicle further comprises:
   determining a desired steady state yaw rate for the vehicle based on the road wheel angle and the velocity; and
   applying a filter to the desired steady state yaw rate, wherein the value of the filter is dependent on the selected one of the plurality of handling states, wherein the step of applying the filter to the desired steady state yaw rate further comprises:
    determining the value of at least one filter coefficient that is dependent on the selected one of the plurality of handling states; and
    applying the filter to the desired steady state yaw rate, wherein the value of the filter is based on the at least one filter coefficient, wherein the step of applying the filter to the desired steady state yaw rate further comprises applying the filter to the desired steady state yaw rate according to the equation:

$$Y\_des = \left(\frac{1 - 2\zeta\omega + \omega^2}{s^2 - s2\zeta\omega + \omega^2}\right)\left(\frac{\tau}{s(\tau - 1) + 1}\right)(Y\_ss)$$

where:
 Y_des is the desired yaw rate;
 s is the Laplace transform variable;
 ζ, ω, and τ are each filter coefficients; and
 Y_ss is the desired steady state yaw rate; and
 activating one or more vehicle stability control measures for the vehicle if the difference between the desired yaw rate and the actual yaw rate for the vehicle exceeds a predetermined threshold.

2. The method of claim 1, wherein the step of determining the desired steady state yaw rate further comprises determining the desired steady state yaw rate for the vehicle as given by the equation:

$$Y\_ss = \left(\frac{\delta V}{L + K\_us V^2}\right)$$

where:
 Y_ss is the desired steady state yaw rate for the vehicle;
 δ is the road wheel angle for the vehicle;
 V is the velocity for the vehicle;
 K_is an understeer gradient for the vehicle; and
 L is the wheel base for the vehicle.

3. The method of claim 1, wherein the step of determining the desired steady state yaw rate further comprises identifying the desired steady state yaw rate that corresponds to the road wheel angle and the velocity in a lookup table.

4. The method of claim 1, wherein the step of determining the value of the at least one filter coefficient further comprises:
identifying a lookup table that corresponds to the selected one of the plurality of handling states, the lookup table associating the velocity of the vehicle with a corresponding value for the at least one filter coefficient; and
identifying the value for the at least one filter coefficient that corresponds to the velocity of the vehicle.

5. The method of claim 1, wherein the vehicle comprises a suspension system having a plurality of operational modes and the step of selecting one of the plurality of handling states of the vehicle further comprises selecting one of the plurality of handling states based on a selected one of the plurality of operational modes of the suspension system.

6. The method of claim 1, wherein the vehicle comprises a plurality of wheels and the step of selecting one of the plurality of handling states of the vehicle further comprises selecting one of the plurality of handling states based on the tire pressure for at least one of the plurality of wheels of the vehicle.

7. The method of claim 1, wherein the step of selecting one of the plurality of handling states of the vehicle further comprises selecting one of the plurality of handling states based on one or more operational faults of the vehicle.

8. A system for determining a desired yaw rate for a vehicle having a plurality of handling states, the system comprising:
a steering angle sensor for providing output signals indicative of a steering angle of the vehicle;
at least one wheel speed sensor for providing output signals indicative of a velocity of the vehicle; and
a processor, coupled to the steering angle sensor and to the at least one wheel speed sensor, the processor configured to:
select one of the plurality of handling states for the vehicle;
determine a road wheel angle based on the steering angle;
determine a desired steady state yaw rate for the vehicle based on the road wheel angle and the velocity; and
apply a filter to the desired steady state yaw rate, wherein the value of the filter is dependent on the selected one of the plurality of handling states and on at least one filter coefficient, wherein the processor is further configured to:
determine the value of the at least one filter coefficient based on the velocity of the vehicle and the selected one of the plurality of handling states,
identify a lookup table that corresponds to the selected one of the plurality of handling states of the vehicle, wherein the lookup table associates the velocity of the vehicle with a corresponding value for the at least one filter coefficient; and
identify the value for the at least one filter coefficient that corresponds to the desired steady state yaw rate;
wherein the value of the filter is determined according to the equation:

$$Y\_Des = \left(\frac{1 - 2\zeta\omega + \omega^2}{s^2 - s2\zeta\omega + \omega^2}\right)\left(\frac{\tau}{s(\tau - 1) + 1}\right)(Y\_ss)$$

where:

Y_Des is the desired yaw rate;
s is the Laplace transform variable;
$\zeta$, $\omega$, and $\tau$ are each filter coefficients; and
Y_ss is the desired yaw rate.

9. The system of claim 8, wherein the desired steady state yaw rate for the vehicle is determined according to the equation:

$$Y\_ss = \left(\frac{\delta V}{L + K\_us V^2}\right)$$

where:

Y_ss is the desired steady state yaw rate for the vehicle;
$\delta$ is the road wheel angle for the vehicle;
V is the velocity of the vehicle;
K_us is an understeer gradient for the vehicle; and
L is the wheel base for the vehicle.

10. The system of claim 8, wherein the processor identifies the desired steady state yaw rate that corresponds to the road wheel angle and the velocity of the vehicle in a lookup table.

11. The system of claim 8, further comprising a suspension system coupled to the processor and having a plurality of operational modes and wherein the processor selects one of the plurality of handling states of the vehicle based on a selected one of the plurality of operational modes of the suspension system.

12. A method for determining a desired yaw rate for a vehicle having a plurality of handling states, the method comprising:
selecting one of the plurality of handling states via a processor;
determining a desired steady state yaw rate for the vehicle based on the road wheel angle and the velocity of the vehicle via the processor; and
applying a filter to the desired steady state yaw rate for the vehicle, wherein the value of the filter is dependent on a selected one of the plurality of handling states and on at least one filter coefficient, and wherein the step of applying the filter to the desired steady state yaw rate further comprises:
determining the value of the at least one filter coefficient based on the velocity of the vehicle and the selected one of the plurality of handling states; and
applying the filter to the desired steady state yaw rate according to the equation:

$$Y\_des = \left(\frac{1 - 2\zeta\omega + \omega^2}{s^2 - s2\zeta\omega + \omega^2}\right)\left(\frac{\tau}{s(\tau - 1) + 1}\right)(Y\_ss)$$

where:

Y_ is the desired yaw rate;
s is the Laplace transform variable;
$\zeta$, $\omega$, and $\tau$ are each filter coefficients; and
Y_ss is the desired steady state yaw rate.

* * * * *